July 24, 1923.
H. D. LATHROP
SPRAYER
Filed Sept. 23, 1920
1,462,970
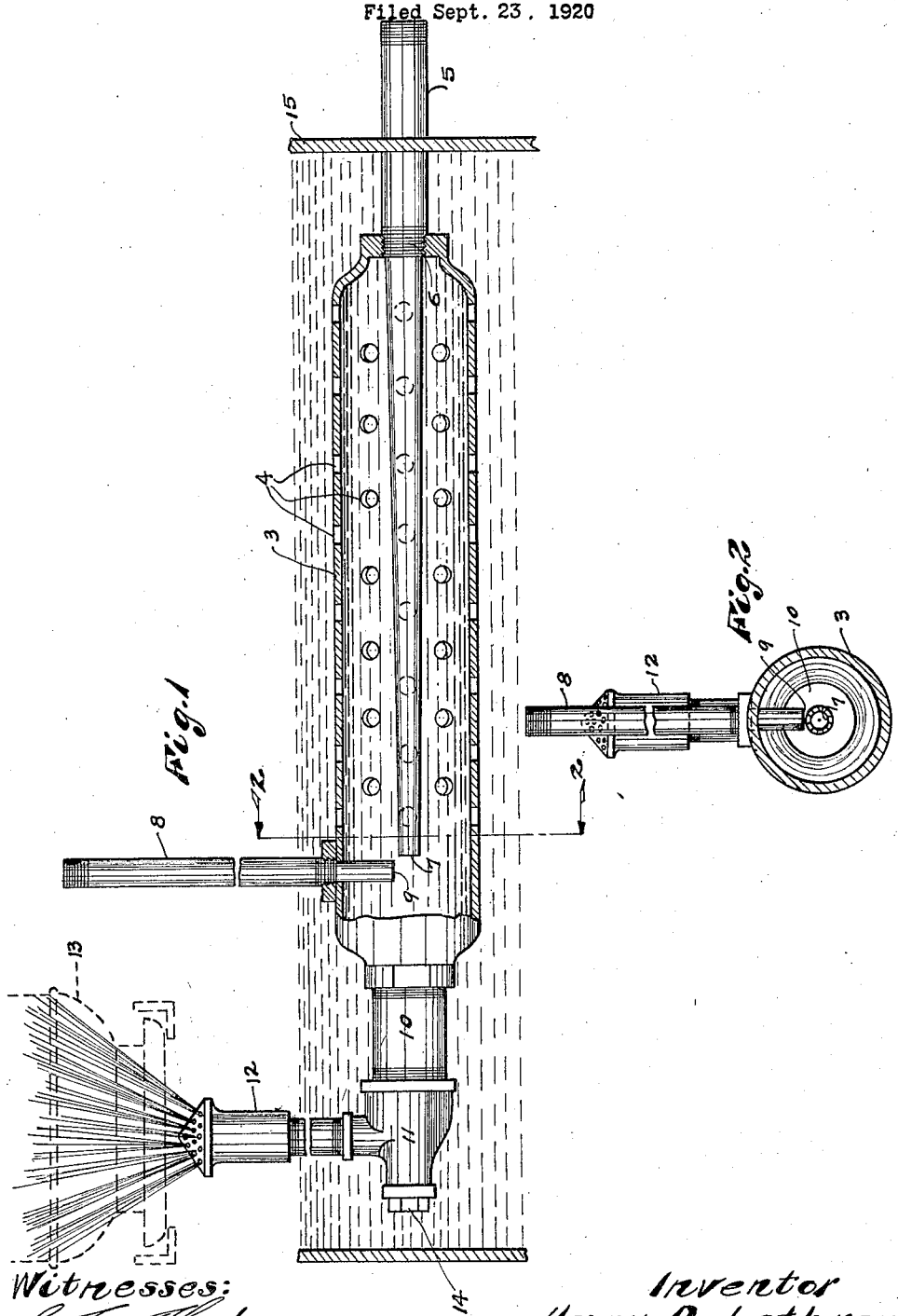
Witnesses:
C. E. Tweedy
B. G. Richards
Inventor
Harry D. Lathrop
By Joshua R. H. Potts
His Attorney Patented July 24, 1923.

1,462,970

UNITED STATES PATENT OFFICE.

HARRY D. LATHROP, OF CHICAGO, ILLINOIS.

SPRAYER.

Application filed September 23, 1920. Serial No. 412,316.

*To all whom it may concern:*

Be it known that I, HARRY D. LATHROP, a citizen of the United States, and a resident of the city of Chicago, county of Cook, and State of Illinois, have invented certain new and useful Improvements in Sprayers, of which the following is a specification.

My invention relates to improvements in sprayers, and has for its object the provision of an improved construction of this character by means of which a spray of hot fluid may be projected therefrom by the use of a jet of steam or the like.

Other objects will appear hereinafter.

The invention consists in the combinations and arrangements of parts hereinafter described and claimed.

The invention will be best understood by reference to the accompanying drawings forming a part of this specification, and in which, Fig. 1, is a longitudinal section of a sprayer embodying the invention, and Fig. 2, a section taken on substantially line 2—2 of Fig. 1.

The preferred form of construction, as illustrated in the drawings, comprises an elongated casing 3 having numerous perforations 4 in the walls thereof. A steam nozzle 5 leads through one end of the casing 3, being threaded at 6 therein, said steam nozzle extending longitudinally through said casing to a position adjacent the opposite end thereof and terminating at the point 7 to project a jet of steam into said casing. A cold water inlet pipe 8 also leads into the casing 3 at substantially right angles to the steam nozzle 5, and terminates at 9 immediately forward of and adjacent the termination of said steam nozzle. An outlet pipe 10 leads from the end of casing 3 opposite and in substantial alignment with the end of nozzle 5, and whereby the jet of steam is directed into said outlet. The end of outlet 10 is provided with a fitting 11 having a branch carrying a spray head 12, which is adapted and arranged to direct the spray into the interior of an inverted milk can 13, or the like. The fitting 11 is also provided with a removable plug 14, by means of which the spray head 12 may be connected to project the spray in the same general direction as the outlet 10, if desired.

In use, the device is immersed in the water in a tank 15 and steam supplied to the nozzle 5 and cold water supplied to the pipe 8. Under these circumstances, a forceful jet or spray of water will be forced from the spray head 12. The device is especially intended and adapted for use on can washing machines for washing milk cans, and is adapted and arranged to spray the interiors thereof with a hot washing solution. By means of this arrangement, I have found that a hot washing solution of a temperature well above 160° F. may be readily sprayed or forced into the interior of the cans without the use of a pump or the like.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The method of producing a spray of hot water which consists in delivering intersecting jets of steam and cold water into a body of water and delivering the commingled water and condensed steam under the action of the steam, through a spray nozzle, substantially as described.

2. The method of producing a spray of hot liquid which consists in delivering commingling jets of steam and cold liquid into a body of hot liquid and delivering the commingling liquid and condensed steam, under the action of the steam, through a suitable nozzle, substantially as described.

3. The combination with a tank adapted to contain a liquid, of a casing positioned in said tank below the normal level of liquid therein, said casing being provided with means for admitting the liquid thereto; a steam nozzle projecting into said casing; a cold liquid inlet leading into said casing; and an outlet leading from said casing, substantially as described.

4. The combination with a tank adapted to contain a liquid, of a casing positioned in said tank below the normal level of liquid therein, said casing being provided with openings in its sides for admitting the liquid thereto; a steam nozzle projecting into said casing; a cold liquid inlet leading into said casing adjacent the discharge end of said nozzle; an outlet leading from said casing; and a spray nozzle connected with said outlet and located above the normal liquid level in said tank, substantially as described.

In testimony whereof I have signed my name to this specification in the presence of two subscribing witnesses.

HARRY D. LATHROP.

Witnesses:
JOSHUA R. H POTTS,
B. G. RICHARDS.